May 1, 1956  W. S. VAN DOK  2,743,564
APPARATUS FOR WRAPPING FRUIT
Filed Oct. 5, 1951
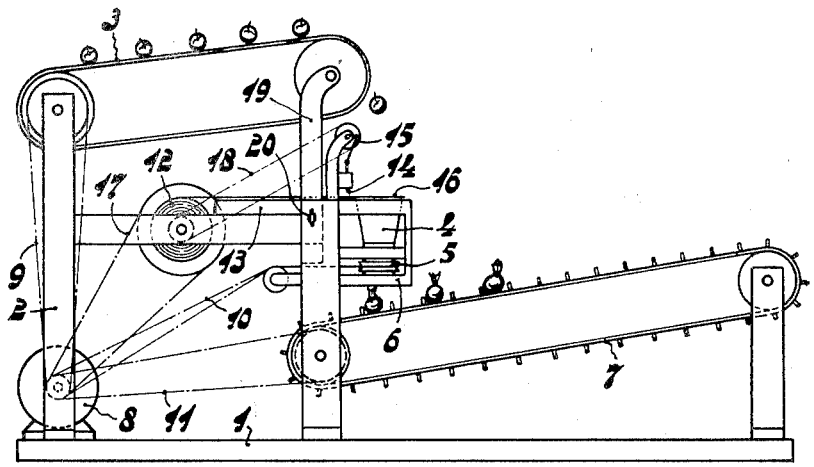
Fig. 1.
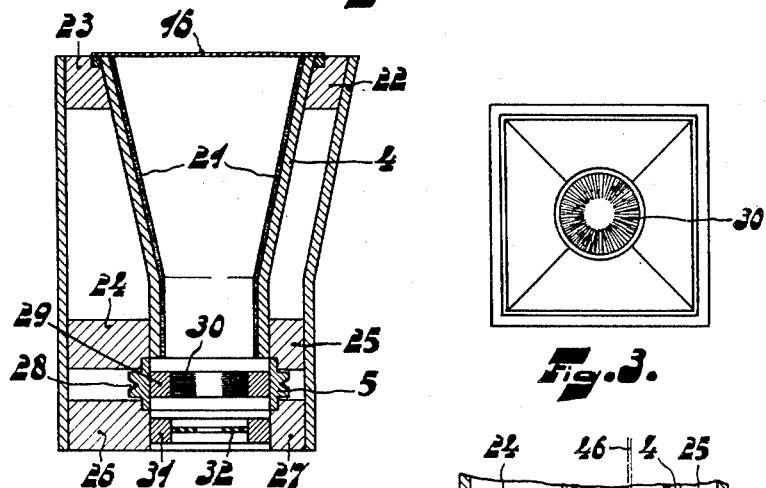
Fig. 2.
Fig. 3.
Fig. 4.
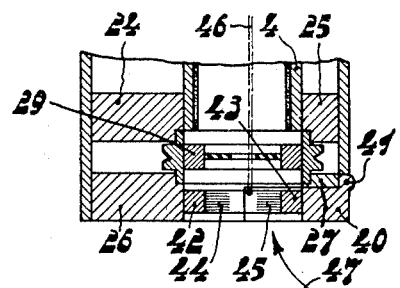
Inventor
Willem Sybrand Van Dok
By
Attorney

United States Patent Office 2,743,564
Patented May 1, 1956

2,743,564
APPARATUS FOR WRAPPING FRUIT
Willem Sybrand van Dok, Enkhuizen, Netherlands Application October 5, 1951, Serial No. 249,971

3 Claims. (Cl. 53—227)

The present invention relates to apparatus for wrapping fruit. The wrapping material may be paper, metal foil, cellophane or other suitable sheet material. Fruit-wrapping requires great care in order to avoid damage to the fruit. The present invention has for its object to provide a fruit wrapping apparatus adapted for mechanically wrapping fruit efficiently and without damage.

According to this invention a fruit wrapping apparatus comprises fruit feeding means adapted for delivering a succession of individual fruits, a wrapping cup of cylindrical form, at least in part, disposed beneath the point of delivery from said feeding means, wrapper feeding means adapted for delivery of wrappers in succession closely over said cup and folding or twisting means disposed immediately beneath the cup and adapted for folding or twisting together wrapper parts extending above each individual fruit after it has become partially wrapped in its descent through the cup.

The means for molding or twisting together those parts of the wrapper which project above the fruit advantageously consists of a rotary ring through which the fruit can pass, said ring being furnished on its inner periphery with an elastic or resilient material adapted for resisting the fall of each fruit in its descent through the ring and for imparting rotatory motion to the fruit and its wrapper, and an arresting device beneath this ring adapted for stopping the rotary motion of the fruit and wrapper whilst the extended parts of the wrapper are still within the influence of the rotary ring.

The arresting device for stopping the rotary motion of the fruit advantageously consist of a stationary ring through which the fruit can pass and which is furnished on its inner periphery with an elastic or resilient material.

Alternatively the means for arresting or impeding the rotating fruit may consist of a support which is covered with an elastic or resilient material and which, or at least part of which, is removable.

This support may be in two halves of which at least one may be removable.

According to another form of construction, one of the rings aforesaid or both rings is or are provided on the inner periphery with radial lips of elastic material.

It is also possible to provide the inner periphery of one or both rings with bristles so as to give a brush formation.

According to a further embodiment of the invention, in order to ensure that within the cup the wrapping material is satisfactorily wrapped around the fruit and in order to avoid that the wrapper, which generally has a rectangular shape should experience too much resistance on one side at the mouth of the cup with the result that the fruit would slip out of the wrapper, the cup is widened towards its upper end and the upper portion has a rectangular form as seen in plan.

It is important that the wrapping cup and the associated rings for twisting the extended ends of the wrapper together should be adapted to the size and weight of the fruit to be packed. Thus, for example, it is desirable that the cross-sectional area of the wrapping cup should be slightly larger than that of the fruit so that during the fall of the fruit the wrapper will be satisfactorily wrapped round the fruit. Furthermore it may be desirable to coat the cup on the inside, for example with felt, in order to prevent the fruit from being damaged. The resistance of the rings below the cup should be such that with a certain weight of the fruit the fall of the latter is sufficiently checked.

In order, therefore, to make the apparatus suitable for packing fruit of different sizes, the cup is removably mounted in one or more holders and can be replaced by a cup of other internal cross-section. In order to adapt the resistance to the fall of the fruit to the weight of the latter, the difference in height between the point at which the fruit leaves the feeding means and the upper end of the wrapping cup can be varied.

It is possible to mount the rings aforesaid so that they can be replaced by rings opposing a different resistance to the fall or motion of the fruit. The resistance can be varied, for example by using lips of greater or lesser rigidity or brushes of larger or smaller length of bristle.

The invention will be explained more fully with reference to the accompanying drawing which represents, by way of example, an apparatus comprising a wrapping cup according to the invention, in which drawing:

Figure 1 is a more or less diagrammatic side elevation of the apparatus.

Figure 2 is a central vertical section, to a larger scale, of the wrapping cup and its associate rings.

Figure 3 is a plan of the cup seen in Figure 2, and Figure 4 is a central vertical section of the lower portion of wrapping cup of slightly modified construction.

Referring to Fig. 1 a base plate 1 has mounted on it a frame 2 at the top of which an endless conveyor belt 3 is supported. A wrapping cup 4 is arranged in the frame 2 so as to be removable. This cup is located beneath the point of delivery of the fruit from the conveyor belt 3. Immediately under the packing cup there is a rotary ring 5 and under the latter is located a stationary ring in a bracket 6. After the fruit has been wrapped up by the cup and rings as hereinafter described it is conveyed, for example by means of a conveyor belt 7, to a place where it is packed in cases.

The apparatus is driven by a motor 8, for example an electric motor, which drives the conveyor belt 3, the rotary ring 5 and the conveyor belt 7 by means of endless belts, cords or ropes 9, 10 and 11 respectively.

On the frame 2 there is also mounted a supply spool 12 for the wrapping material, for example paper. This material is fed over the table 13 to a position closely above the cup 4. In one side of the cup there is mounted a knife 14 which can be moved up and down by means of an eccentric 15, thus cutting off pieces 16 of the size desired for the individual wrappers. The supply spool 12 is driven by the motor by means of the belt or cord 17, the movement of the knife being derived, with the aid of the cord 18, from the movement of the supply spool.

The difference in height between the point where the fruit falls from the conveyor belt 3 and the top of the cup 4 can be adjusted at will by sliding the support 19 up or down in the frame 2, the adjusted position of the support 19 being set securely with the aid of a set-screw 20.

The fruit, for example apples or pears, is fed forward, with regular intervals between the individual fruits, by the conveyor belt 3. At the same time wrapping material is continuously supplied from the supply spool 12. The knife 14 cuts off each time a piece of the desired size; this piece just covers the upper end of the packing cup 4. In its fall from the conveyor belt 3, the fruit takes a wrapper along with it into the cup and within the cup this wrapper is wrapped round the fruit. The wrapped fruit then falls on to the conveyor belt 7 or any other suitable conveying device, and is conveyed to a place where it may be packed in a case. In order to synchronize the supply of fruit and the supply of wrappers, the conveyor belt 3 is provided with marks, indentations or the like on which the fruit may be placed with the correct spacing.

Referring to Figure 2, it will be seen that the lower portion of the cup 4 has a cylindrical shape whereas the upper portion is widened upwards to form a funnel of the rectangular shape seen in plan in Figure 3. The funnel is coated on the inside with a layer of felt 21. The cup 4 is suspended in holders 22, 23 and 24, 25. The ring 5 is rotatable between the holders 24, 25 and 26, 27. This ring has a V-groove 28 for guiding a cord with the aid of which the ring can be rotated. A ring 29 may be provided in the ring 5 so as to be removable, for example by means of a bayonet joint. The ring 29 is internally provided with bristles forming a brush 30. A stationary ring 31, provided on the inside with radial lips 32 of elastic material, for example rubber, may be provided in the holders 26 and 27 so as to be removable and this ring 31 corresponds with the ring in the bracket 6 referred to in the description of Figure 1.

The actual wrapping operation which takes place in the cup is therefore as follows:

A severed wrapper 16 rests on the top of the wrapping cup 4. During its fall into the cup, a fruit takes this wrapper along with it, the wrapper becoming folded upwardly around the fruit. On arriving at the level of the brush 30 of the rotating ring 29 the fruit is temporarily arrested in its fall through the cup and acquires a rotary motion during its retarded passage through the brush 30. After having passed through the ring 29 the partially wrapped fruit comes to rest temporarily upon the elastic lips 32 of the stationary ring 31, the rotary motion imparted by the ring 29 being now checked. The distance between the rings 29 and 31, however, is such that parts of the wrapper extending above the partly wrapped fruit are still in the rotating ring so that these parts are twisted together. Under the weight of the fruit, the elastic lip 32 gradually gives way and the fruit then drops out of the wrapping cup. If fruit of smaller dimensions has to be packed the cup 4 may be replaced by a cup of smaller cross-sectional dimensions. The rings 29 and 31 are also replaceable so that rings opposing a different resistance to the fall and rotation of the fruit may be provided in the apparatus.

In the above described construction, the rotary ring is provided with brushes and the stationary ring with elastic lips. It will be evident, however, that it is also possible for both rings to have either brushes or elastic lips.

Fig. 4 illustrates a slight modification of the wrapper twisting means. In this modification one half of a supporting ring located under the rotary ring 29 can tip down, thus enabling the fruit to have a timed fall upon a conveyor belt arranged beneath. In this figure similar parts are denoted by the corresponding references used in Figs. 2 and 3.

Under the holder 27 there is a holder 40 which is secured to the holder 27 by means of a hinge 41. One half 42 of the stationary ring is secured to the holder 26 and the other half 43 is secured in the holder 40. Both halves of the stationary ring are provided with comparatively stiff brushes around the inner periphery. To the holder 40 is secured a rod 46 which is connected to an eccentric (not shown), thus permitting of the holder being opened in the direction of the arrow 47 with timed operation.

On the halves 42 and 43 of the ring the rotary motion of the fruit is checked. Subsequently the holder 40 is moved in the direction of the arrow 47 and the fruit falls out of the device as aforesaid.

What I claim is:

1. Fruit wrapping apparatus comprising in combination: a hollow tube open at each end and disposed in a substantially vertical position; means for causing a succession of individual fruits to fall through said tube; means operating in timed relation to said first mentioned means for delivering a succession of wrapping sheets across the upper end of said tube, so that each fruit in its fall through the tube carries the wrapping sheet with it, becomes partially wrapped therein, and forms a trailing wrapper portion; a first ring rotatably mounted adjacent the lower end of said tube; resilient means disposed around and extending radially inwardly from the inner periphery of the ring to engage and retard the downward progress of the partially wrapped fruit; means for rotating said ring; and a second non-rotatable ring spaced vertically below the first ring and including a resilient center portion to engage and further retard the downward progress of the partially wrapped fruit and to resist rotary motion thereof so that the rotating upper ring completes the wrapping operation by relatively twisting the trailing portion of the wrapper while the fruit is in continuous downward motion.

2. Apparatus as defined by claim 1 in which are hollow tube comprises an upper portion rectangular in cross-section and tapering from top to bottom, and a lower portion in the form of a straight hollow cylinder.

3. Apparatus as defined by claim 1 in which the means for causing the succession of individual fruits to fall through said tube comprises a conveyor mechanism disposed above the upper end of the tube, and in which means are provided for varying the vertical position of the discharge of the conveyor mechanism with respect to the upper end of the tube.

References Cited in the file of this patent

UNITED STATES PATENTS

| | | |
|---|---|---|
| 336,823 | Rice | Feb. 23, 1886 |
| 516,638 | Nininger | Mar. 13, 1894 |
| 867,176 | Warwick | Sept. 24, 1907 |
| 973,863 | Grover | Oct. 25, 1910 |